United States Patent

Eskew et al.

[15] 3,702,004

[45] Oct. 31, 1972

[54] PROCESS AND SYSTEM FOR ROUTING INTERCONNECTIONS BETWEEN LOGIC SYSTEM ELEMENTS

[72] Inventors: Mark F. Eskew, Richardson; Beverly F. Hyde, Dallas, both of Tex.

[73] Assignee: Texas Instruments Incorporated, Dallas, Tex.

[22] Filed: Jan. 8, 1970

[21] Appl. No.: 1,525

[52] U.S. Cl. ..............................444/1, 235/151.11

[51] Int. Cl. ..............................G06f 15/20

[58] Field of Search ......340/172.5; 29/624; 317/101; 235/151.11

[56] References Cited

UNITED STATES PATENTS

| | | | |
|---|---|---|---|
| 3,391,392 | 7/1968 | Doyle | 340/172.5 |
| 3,529,298 | 7/1970 | Lourie | 340/172.5 |

OTHER PUBLICATIONS

Heath, F. G., Large Scale Integration In Electronics, Scientific American, Vol. 222, No. 2, Feb. 1970.

Brever, General Survey of Design Automation in Digital Computers, Proceedings of IEEE, Vol. 54, No. 12, Dec. 1966, pp. 1708- 1721.

Lee, An Algorithm for Path Connections and its Applications, IEEE Trans. on Elec. Computers, September 1961, pp. 346- 365.

*Primary Examiner*—Paul J. Henon
*Assistant Examiner*—Sydney R. Chirlin
*Attorney*—James O. Dixon, Andrew M. Hassell, Harold Levine, Melvin Sharp, John E. Vandigriff, Henry T. Olsen, Michael A. Sileo, Jr. and Gary C. Honeycutt

[57] ABSTRACT

Artwork for a logic circuit to be fabricated by printed circuit board techniques is produced by a data processing machine programmed to run a packaging routine, a placement routine, and a routing routine, in addition to check routines. All logic elements for a particular circuit are coded and identified prior to carrying out any of the machine run routines. This circuit diagram information, along with mechanical criteria of the printed circuit board on which the circuit is to be fabricated, are supplied as input data to the data processing machine. The data processing machine first takes the coded circuit diagram information and checks it for errors. It then packages the individual logic elements into multi-element units (integrated circuits). Upon completion of the packaging routine, the data processor places the multi-element units within the limits of the mechanical criteria supplied as input data. After the packaging and placing routines have been completed, the machine routes interconnections between the terminal pins of the multi-element units using a numbered ordered maze restrained to proceed within pre-established limits.

22 Claims, 16 Drawing Figures

INVENTORS:
MARK F. ESKEW
BEVERLY HYDE
Henry T. Olsen
ATTORNEY

PATENTED OCT 31 1972 3,702,004

INVENTORS:
MARK F. ESKEW
BEVERLY HYDE

ATTORNEY

PATENTED OCT 31 1972 3,702,004

SHEET 06 OF 12

INVENTORS:
MARK F. ESKEW
BEVERLY HYDE

ATTORNEY

INVENTORS:
MARK F. ESKEW
BEVERLY HYDE

ATTORNEY

INVENTORS:
MARK F. ESKEW
BEVERLY HYDE

ATTORNEY

INVENTORS
MARK F. ESKEW
BEVERLY HYDE

ATTORNEY

INVENTORS:
MARK F. ESKEW
BEVERLY HYDE

ATTORNEY

INVENTORS:
MARK F. ESKEW
BEVERLY HYDE

ATTORNEY

PROCESS AND SYSTEM FOR ROUTING INTERCONNECTIONS BETWEEN LOGIC SYSTEM ELEMENTS

This invention relates to a circuit layout technique, and more particularly to a process for producing artwork for a logic circuit to be fabricated by printed circuit techniques.

Heretofore, the artwork for most logic circuits that were fabricated on a printed circuit board was drawn by hand using "cut and try" procedures. So long as the logic system was of a simple design, manual layout techniques produced accurate artwork for use in the manufacture of the printed circuit board. With the increased complexity of logic systems, the artwork produced by hand contained an unacceptable number of errors. Further, as the logic circuitry became more complex, the time required for the hand layout increased to a prohibitive level.

It was early recognized that data processing machines (computers) could be used to layout and produce the artwork for logic circuits. Many processes have been developed for use with data processing machines to assist in laying out and producing the artwork for a logic circuit. Most of these processes have been directed to routing techniques performed by a data processor to interconnect the various logic elements or packages of elements that have been previously assigned a given location.

An object of this invention is to provide a process for producing circuit artwork by means of a data processing machine. Another object of this invention is to produce circuit artwork by a data processing machine that runs a check routine on the input data. Yet another object of this invention is to produce circuit artwork by a data processing machine that assigns individual circuit elements to multi-element packages. A further object of this invention is to provide a process for producing circuit artwork with a data processing machine that assigns multi-element packages within limits of mechanical criteria. Yet another object of this invention is to provide a process for producing circuit artwork using a data processing machine to route interconnections between various terminal pins of multi-element units previously located. Yet another object of this invention is to produce circuit artwork by a data processing machine that runs a check routine on the routed interconnections. A still further object of this invention is to provide a process for producing circuit artwork using a data processing machine that assigns individual circuit elements to a multi-element package by repetitive steps that select the best multi-element package. Still another object of this invention is to provide a process for producing circuit artwork using a data processing machine that places a multi-element package within circuit criteria on the basis of a calculated score. An additional object of this invention is to provide a process for producing circuit artwork using a data processing machine that routes interconnections between elements by a numbered ordered maze constrained to run within pre-established limits.

In accordance with one process for producing circuit artwork, artwork for a logic system is produced by initially packaging individual circuit elements by a routine that selects the best multi-element unit yet by a first comparison of one multi-element unit with a multi-element unit formed from elements of another type. After all the multi-element units have been considered in a first pass, the best unit is then considered a fixed package and additional passes are made to select the best multi-element unit by an additional series of comparisons. After each selection of a best multi-element unit for a given comparison, the remaining multi-element unit formed for that comparison is cancelled and a new multi-element unit of that type will be formed in the subsequent pass. After completing the packaging routine, the multi-element units are located on a printed circuit board within limits of mechanical criteria supplied as input data to the processing machine. After packaging and placing the circuit elements, routing interconnections are generated between terminal pins of the individual elements using a numbered ordered maze. To complete the process of defining interconnections between the elements, the routing information is conveyed to a plotter that generates the artwork for a desired logic system.

In accordance with another process for producing circuit artwork, coded information of a logic system including mechanical criteria is input data to a data processing machine. First, the data processor generates representations of multi-element packages containing the individual elements of the logic system. After completion of the packaging routine, the multi-element packages are located on a printed circuit board within limits of the mechanical criteria supplied to the machine. To locate the multi-element packages formed by the packaging routine, the data processor computes a "score" for each multi-element unit to be located. Starting with the best score, the packages are located in the best legitimate position available for that unit. The remaining units are then considered after recomputing a score for the effected units, starting with the best remaining score, and the unit with the highest score is placed in a best legitimate position. This process is repeated until all packages have been placed. After placing all the multi-element packages on a score basis, the entire logic system is reinvestigated to determine if an improvement of the initial placement is possible. Upon completion of the placement routine, the data processor interconnects terminal pins of the individual circuit elements using a numbered ordered maze. Finally, the routing information is conveyed to a plotter that generates artwork for the logic system coded into the data processor.

In accordance with still another process for producing circuit artwork, circuit artwork for a logic system is generated using a plotter connected to the output of a data processor. Input information to the data processor includes identifying codes for each of the logic circuit elements, the element terminal pins, signature identification and mechanical criteria. First, the individual circuit elements are packaged into multi-element units on the basis of the circuit identification codes, terminal pin codes, and signature codes. These multi-element units are then located on a printed circuit board within mechanical criteria supplied as input data to the data processor. After packaging and placing the logic elements, interconnections between terminal pins of the various elements are established using a numbered ordered maze restrained to proceed within pre-established limits. Input information to the routing routine includes signal set groups which consist of pin identification (including X and Y coordinates) along with "from-to" information. Starting at the first pin location in a pin listing, a numbered ordered maze is constructed within pre-established limits until it reaches a destination point. Upon reaching a destination point, a backtrack routine is called which establishes the shortest path within the maze back to the start point. The routing routine of the present invention includes three passes for interconnecting the various element terminal pins. Each pass restricts the maze progression to certain predefined limits. Upon completion of one run of the routine, the interconnections not completed on the first run may be attempted by running the routing routine again, each time changing the bounding criteria. After all the interconnections have been completed, a plotter is supplied the coded information produced by the data processing machine to generate artwork for the logic system of interest.

In accordance with yet another process for producing circuit artwork, a data processing machine supplies input information to a plotter that produces the circuit artwork. Input information to the data processor includes coded information defining the logic circuit. This coded information includes logic element coding, terminal pin coding, signature identification and mechanical criteria. Initially, the data processor calls a check routine that checks the coded input information to determine if errors exist in the logic diagram. For example, the input of a logic element may not be connected to a source, or a source may be connected to more elements than it is capable of driving without overloading. After checking to insure that the coded logic information contains no errors, a routine run by the data processor packages the logic elements into multi-element units. These multi-element units are located on a printed circuit board constrained by mechanical input criteria by a package placing routine. Next, a routing routine establishes coded data for interconnecting paths between terminal pins of the logic elements using a numbered ordered maze. The routing routine may be run as many times as desired in an attempt to complete all interconnections. Upon completion of the routing routine, the coded data representing the interconnecting paths is checked for completeness. Upon completion of the routing check, the coded routing data is conveyed to a plotter that produces artwork for a logic system.

A more complete understanding of the invention and its advantages will be apparent from the specification and claims and from the accompanying drawings illustrative of the invention.

Certain portions of the method herein disclosed are not of our invention, but are the inventions of: Joseph A. Ballas and Robert A. Penick as defined by the claims of their application, Ser. No. 001,366, filed Jan. 8, 1970, now U.S. Pat. No. 3,653,072; John W. Hill and Charles L. Satterwhite as defined by the claims of their application, Ser. No. 001,346, filed Jan. 8, 1970, now U.S. Pat. No. 3,653,071; and Joseph A. Ballas and Robert A. Penick as defined by the claims of their application, Ser. No. 001,447, filed Jan. 8, 1970, all such applications being assigned to the assignee of the present application.

Referring to the drawings.

Figure 1:
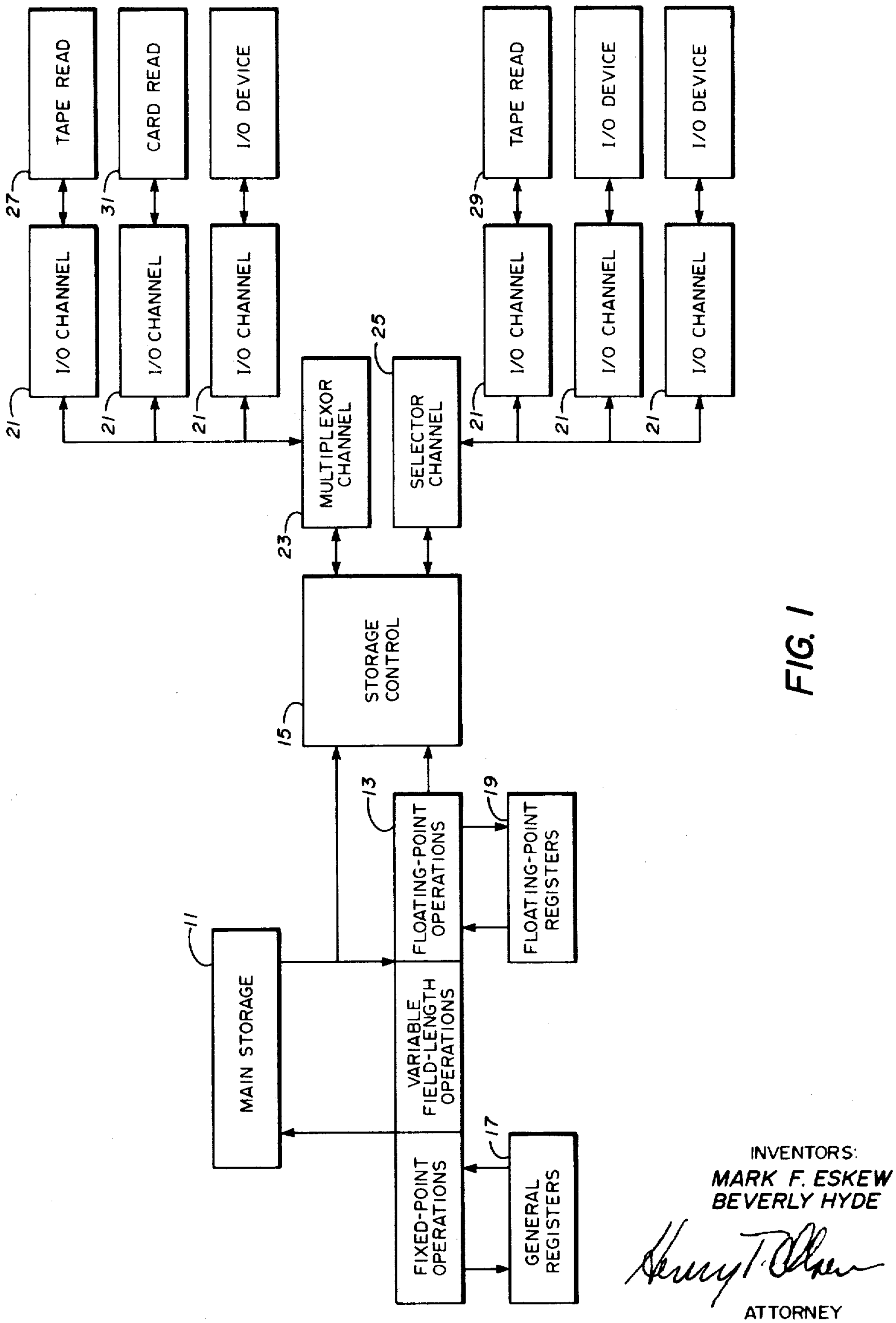
FIG. 1 is a block diagram of a data processing machine for generating instructions for the production of circuit artwork.
Figure 2:
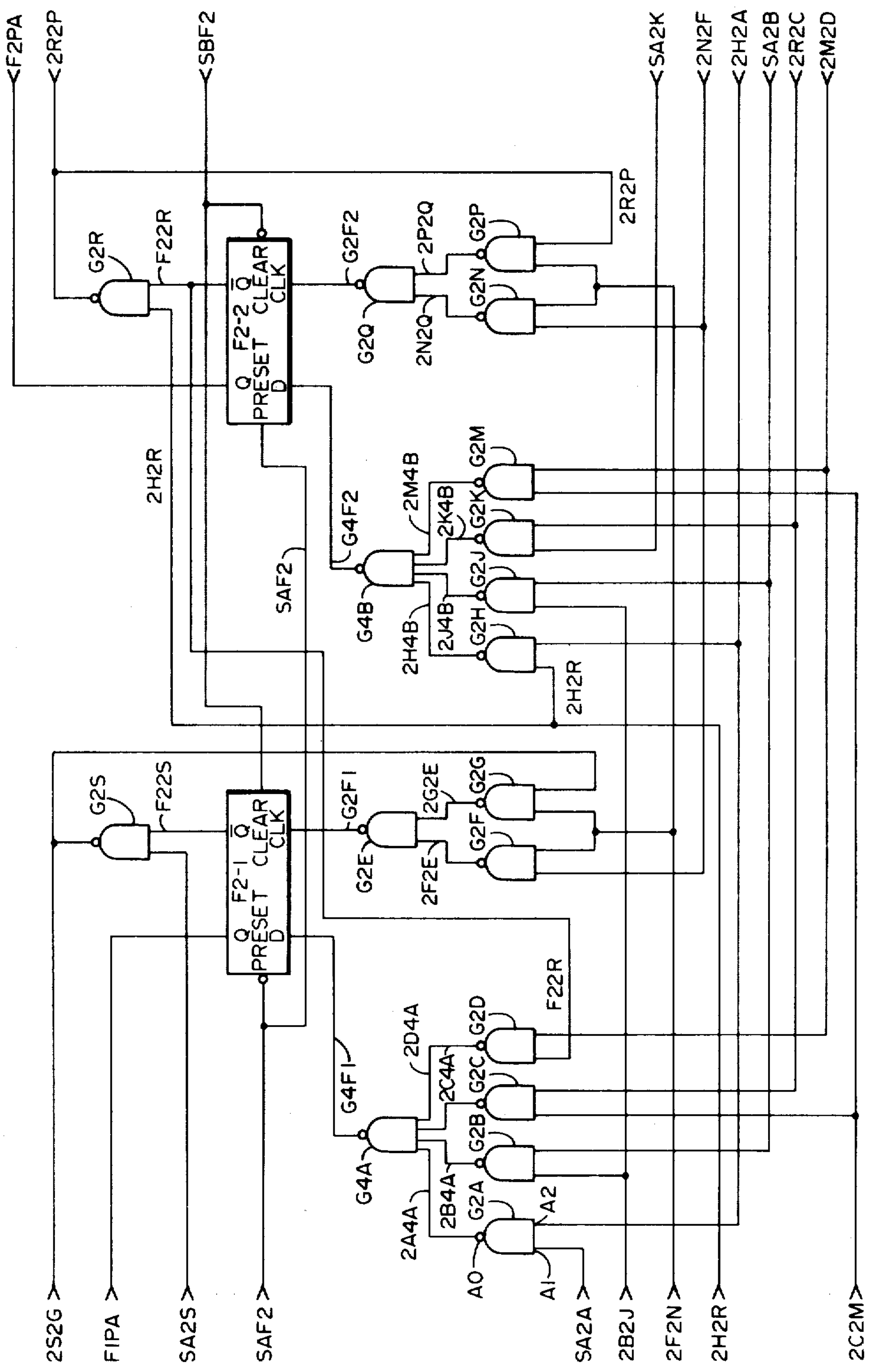
FIG. 2 is a schematic diagram of a logic system including coding information to be read into the data processing machine of FIG. 1 for generating artwork for a printed circuit board.
Figure 3:
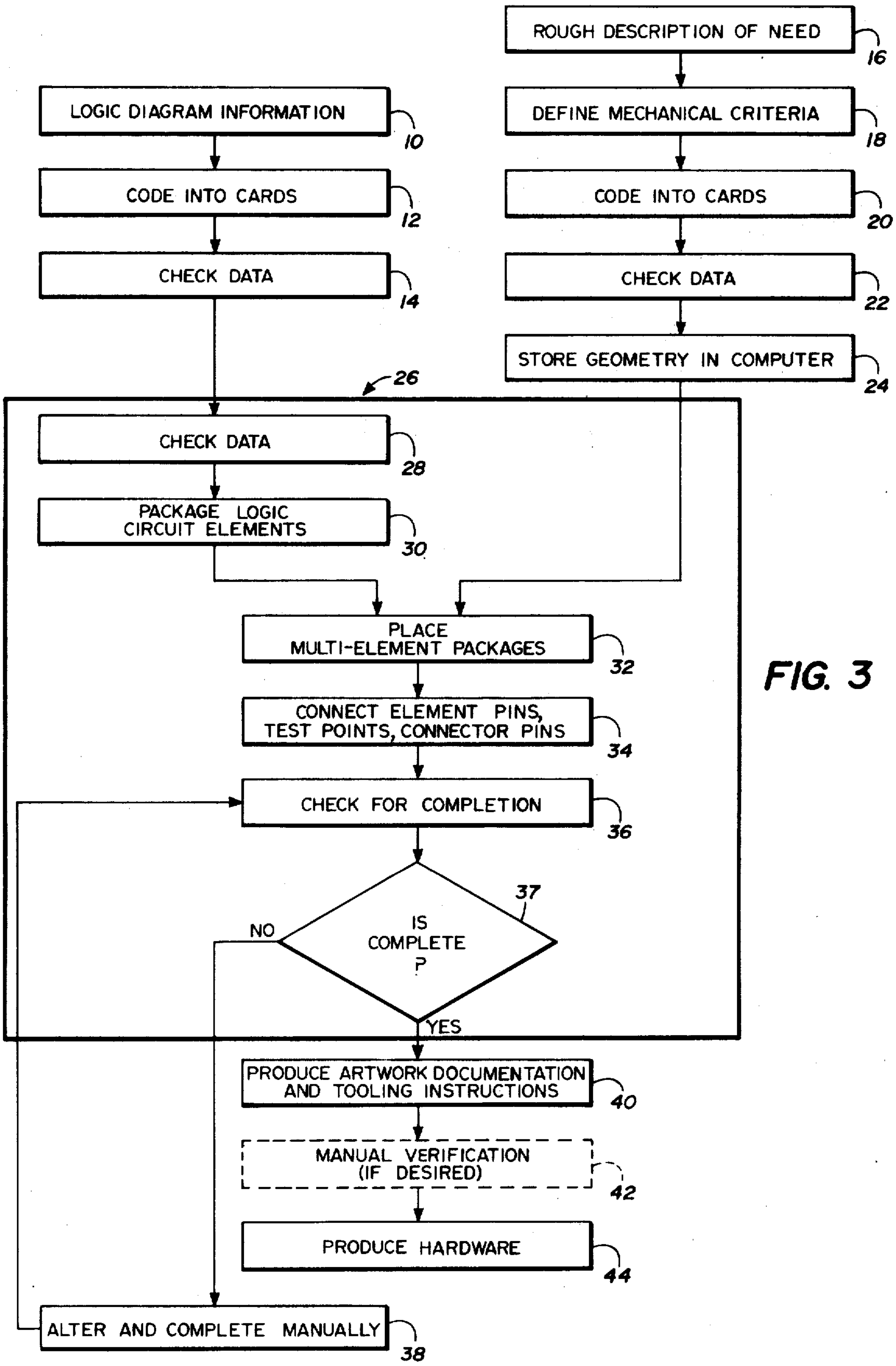
FIG. 3 is a flow chart of a process for producing artwork for a logic system of the type illustrated in FIG. 2.
Figure 4:
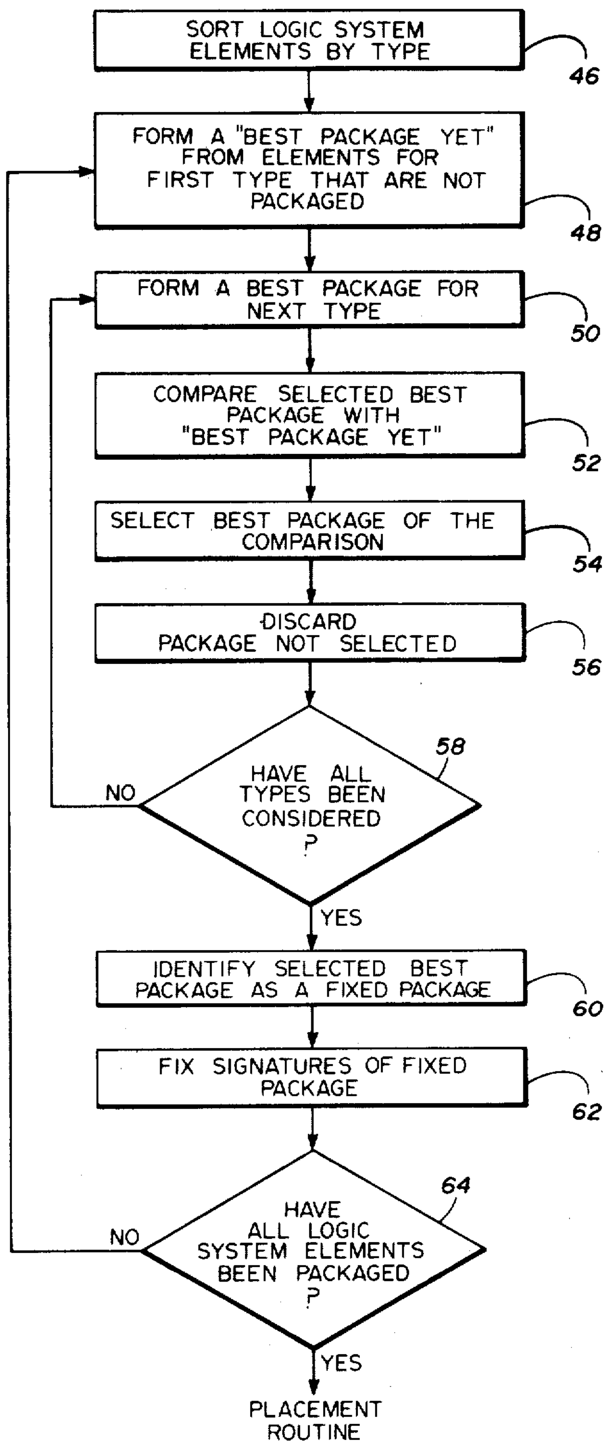
FIG. 4 is a flow chart of a routine run by a data processing machine for packaging circuit elements into multi-element packages.
Figure 5:
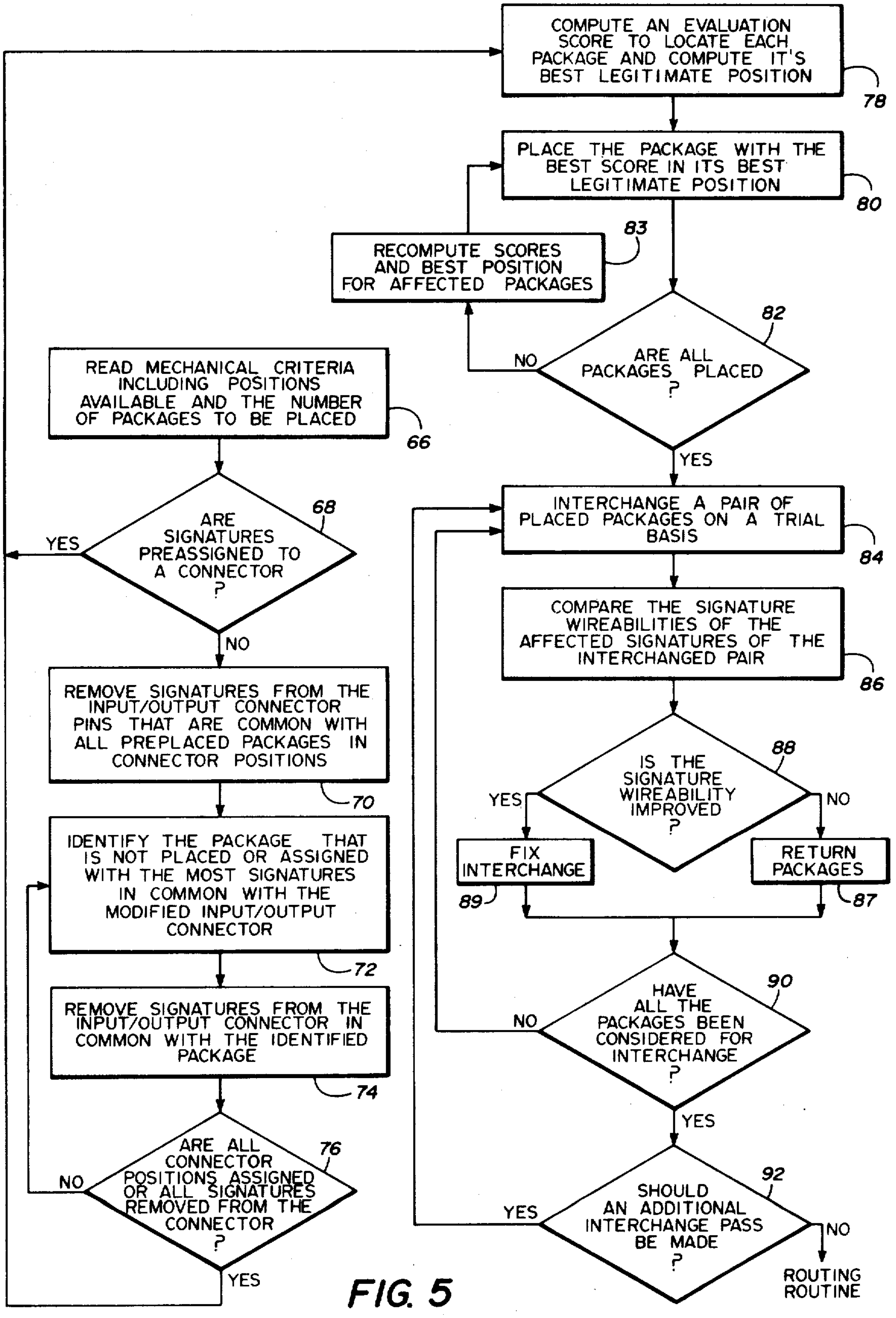
FIG. 5 is a flow chart of a routing run by a data processing machine for placing multi-element packages on a printed circuit board within mechanical criteria.
Figure 6:
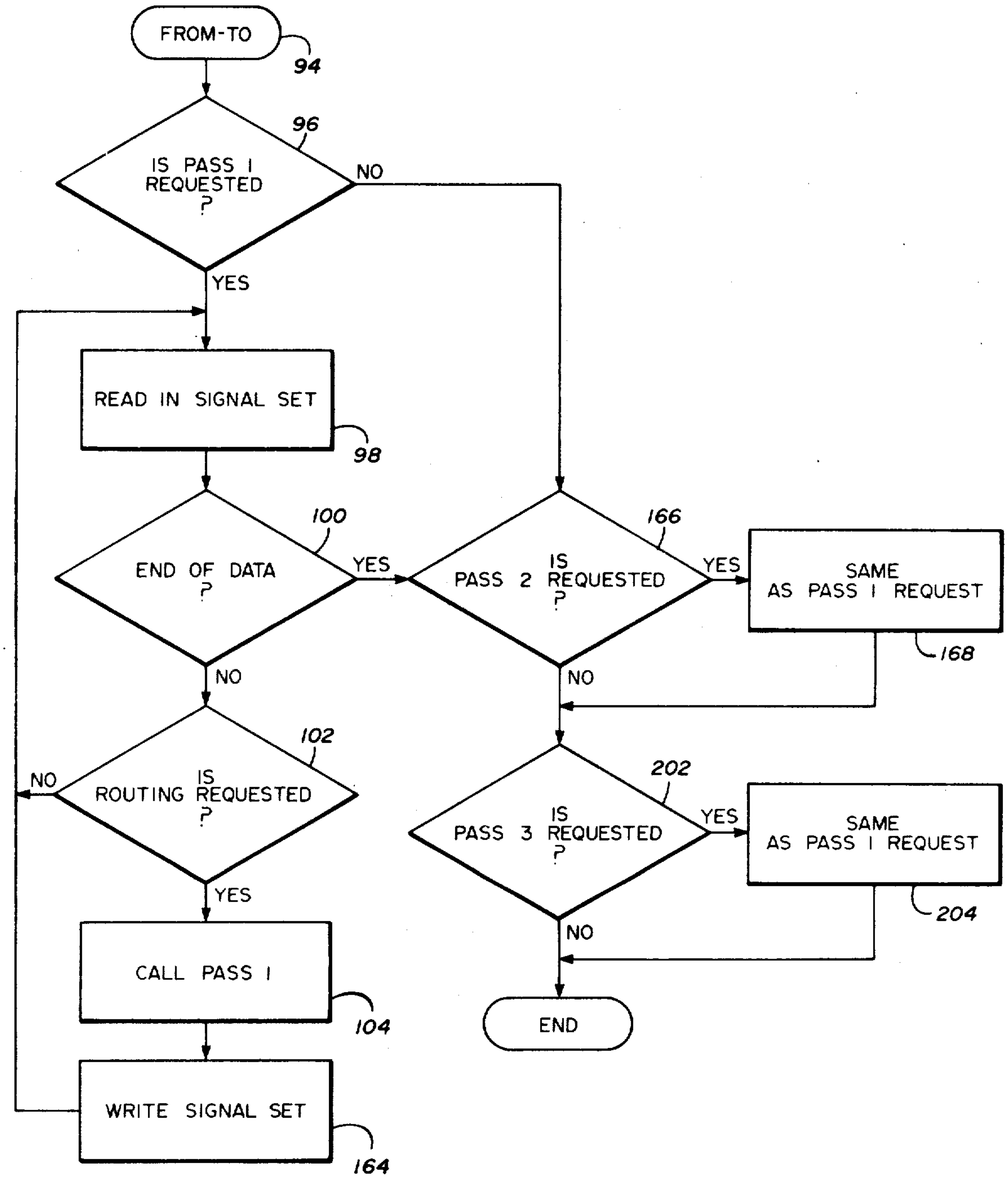
FIG. 6 is a flow chart of the routing routine run by a data processing machine for interconnecting element pins on a printed circuit board.
Figure 7:
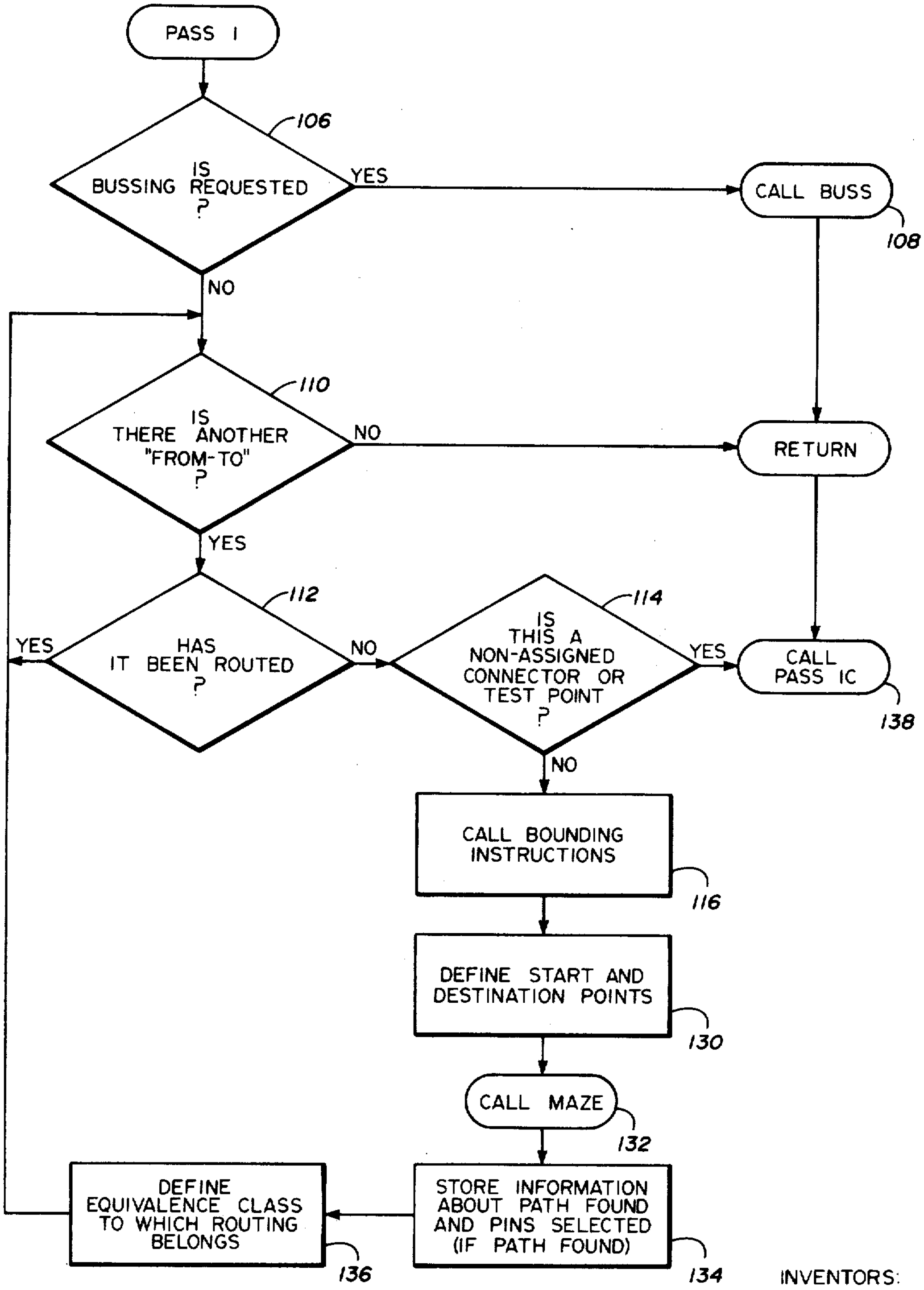
FIG. 7 is a flow chart of a pass one subroutine called by the routing routine of FIG. 6.
Figure 8:
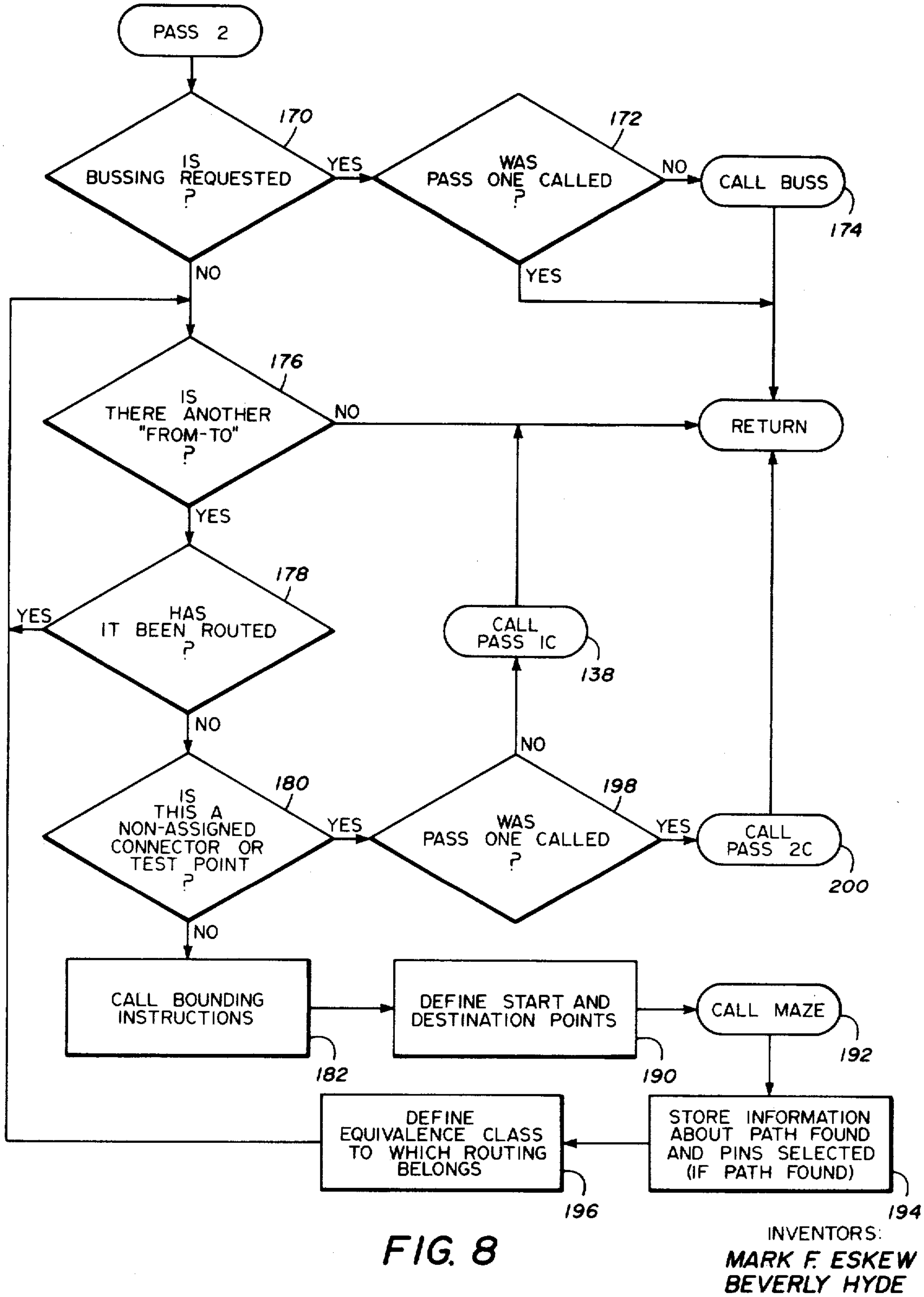
FIG. 8 is a flow chart of a pass two subroutine called by the routing routine of FIG. 6.
Figure 9:
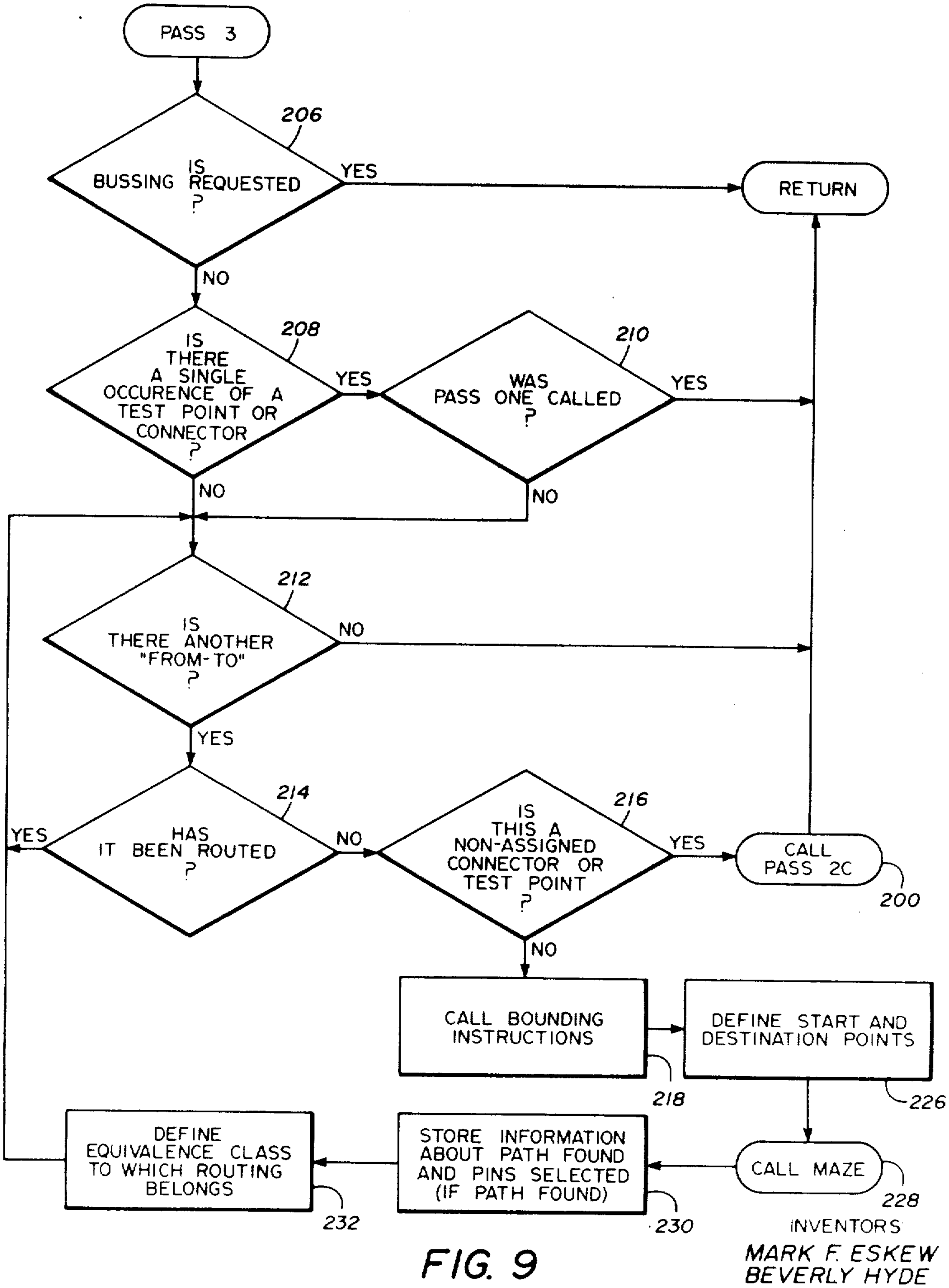
FIG. 9 is a flow chart of a pass three subroutine called by the routing routine of FIG. 6.
Figure 10:
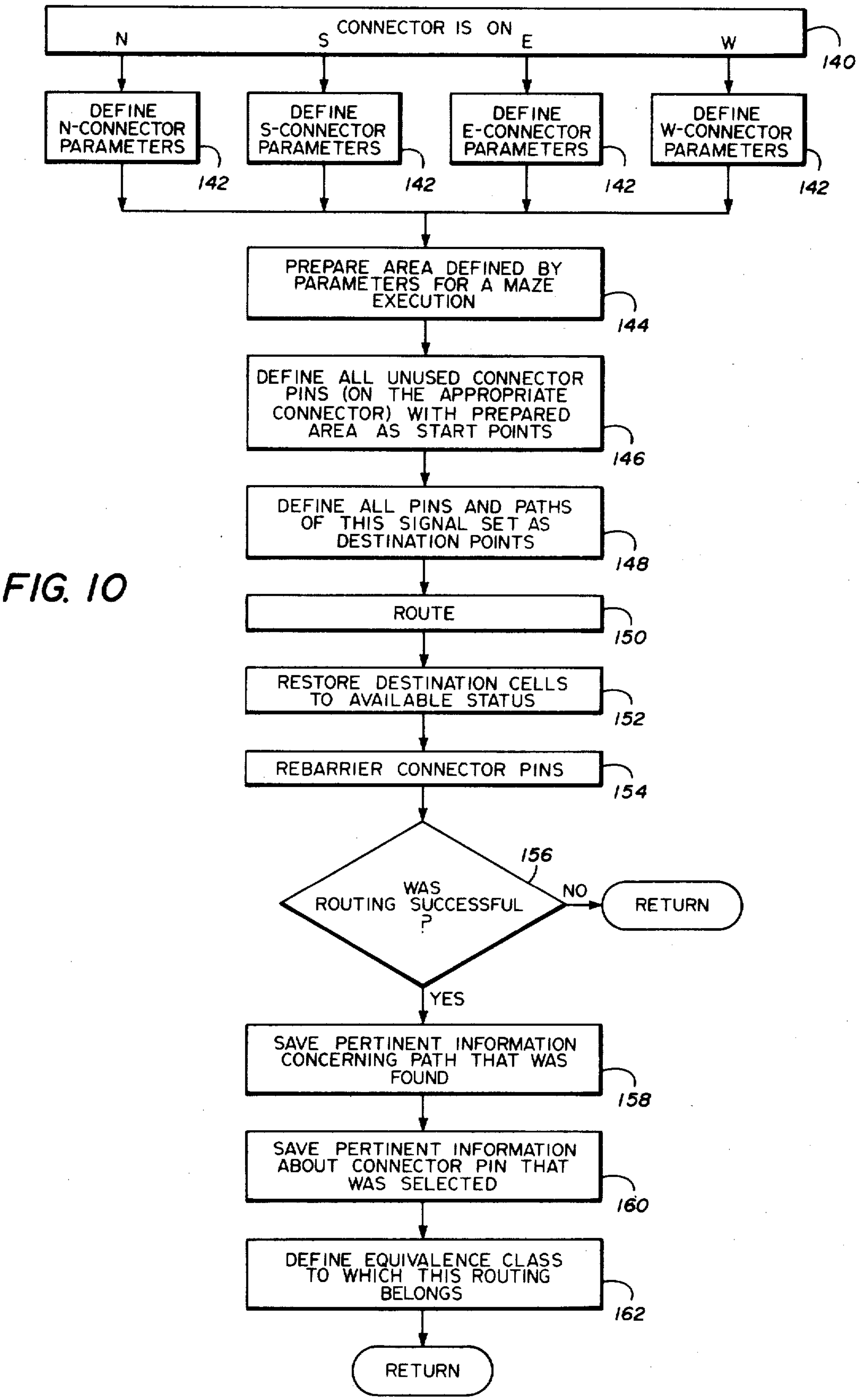
FIG. 10 is a flow chart of a connector subroutine called by the routing routine of FIG. 6.
Figure 11A:
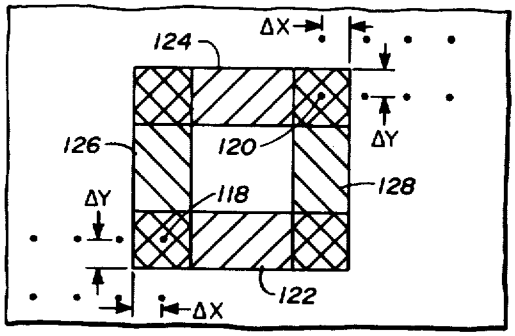
FIGS. 11A, 11B and 11C illustrate bounding limitations for the three subroutines of FIGS. 7, 8 and 9, respectively.
Figure 11B:
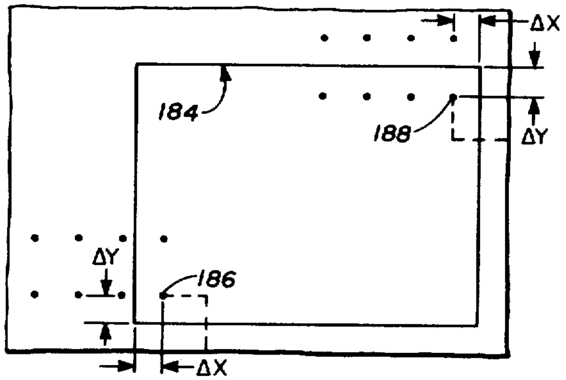
Figure 11C:
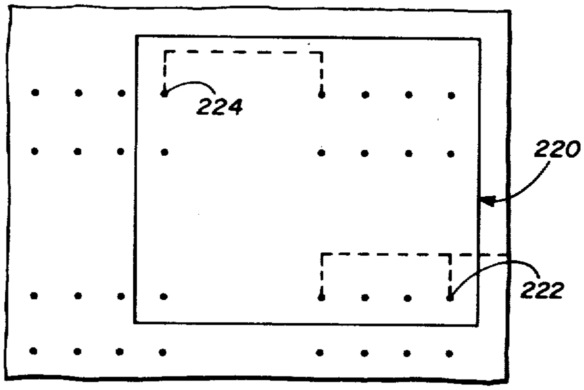
Figure 12:
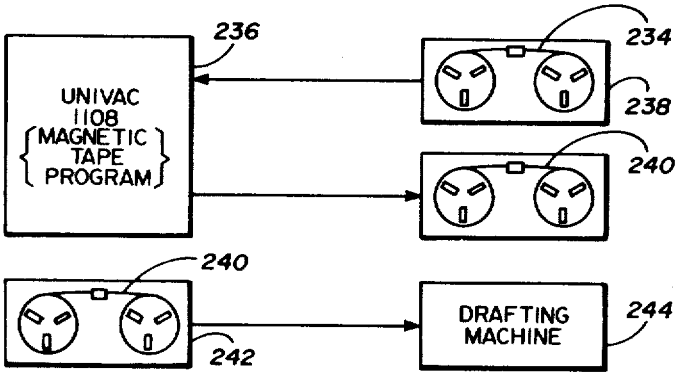
FIG. 12 is a block diagram of a system for generating artwork for a printed circuit board.
Figure 13:
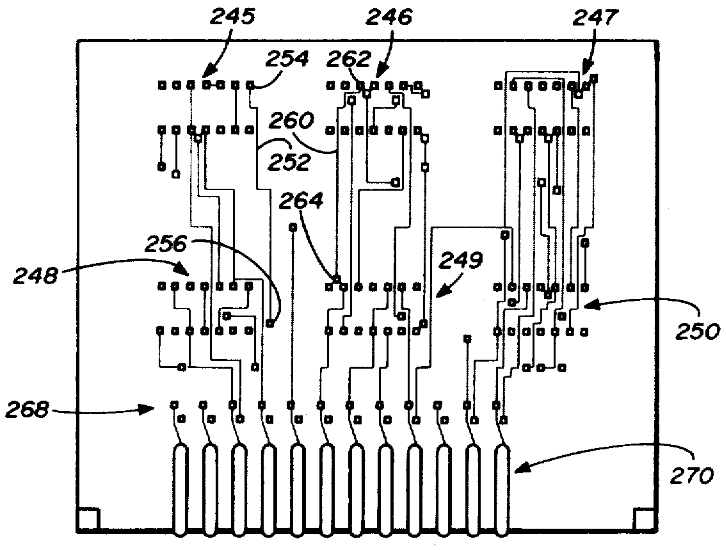
FIG. 13 illustrates the artwork for the top side of a two-sided printed circuit board for the system of FIG. 2.
Figure 14:
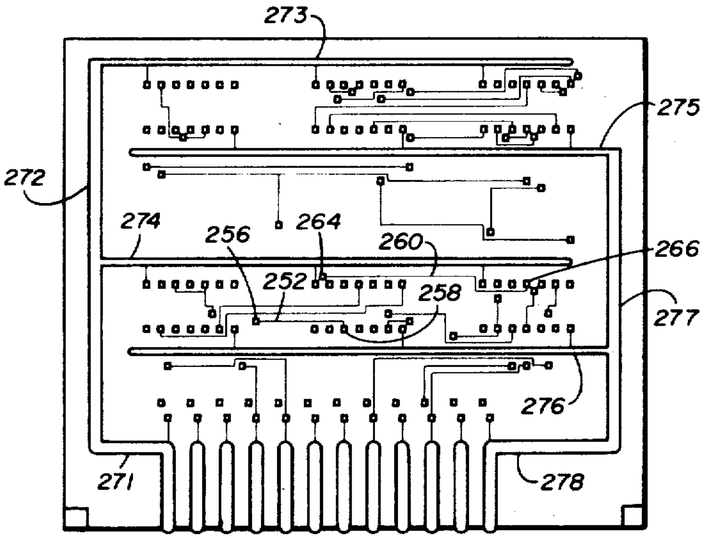
FIG. 14 illustrates the artwork for the bottom side of a two-sided printed circuit board for the logic system of FIG. 2.

For a complete description of our invention including a complete description of FIGS. 1-14, reference is made to U.S. Pat. No. 3,653,072, issued to Joseph A. Ballas and Robert A. Penick on Mar. 28, 1972, and assigned to the assignee of the present invention. The specification of U.S. Pat. No. 3,653,072 is hereby incorporated herein by reference and made a part hereof.

We claim:

1. In a process for producing circuit artwork by a data processing machine from coded information of a logic system wherein the data processor generates data representing packages of the logic system elements, assigns locations to the packaged elements, routes the interconnections between terminal pins of the packaged logic system elements and produces instructions for operating a data plotter to generate the circuit artwork, the steps in the routing routine of:

identifying signatures between terminal pins of the logic system elements and coding the coordinates of the terminal pin locations, establishing bounding limits within which a numbered ordered maze will be developed, developing a numbered ordered maze within the predetermined bounding limits from a starting pin to a destination pin for an interconnection, and backtracking through the ordered maze to generate a representation of an interconnection between a start pin and a destination pin.

2. A process for producing circuit artwork by a data processing machine as set forth in claim 1 including repeating the steps of:

developing a numbered ordered maze within the predetermined bounding limits from a starting pin to a destination pin for each interconnection in the logic system, and backtracking through the ordered maze for each interconnection to generate a representation of a connecting path between a start pin and a destination pin.

3. A process for producing circuit artwork by a data processing machine as set forth in claim 1 including the step of assigning each path generated by the backtracking routine to a defined equivalence class.

4. A process for producing circuit artwork by a data processing machine as set forth in claim 1 where the numbered ordered maze is developed from multiple starting points and proceeds to multiple destination points.

5. A process for producing circuit artwork by a data processing machine set forth in claim 1 wherein the numbered ordered maze is developed from multiple start points to a single destination point.

6. A process for producing circuit artwork by a data processing machine as set forth in claim 1 wherein backtracking through the ordered maze proceeds along channel priorities read into the data processor as input data.

7. A process for producing artwork by a data processing machine as set forth in claim 6 wherein the backtracking routine proceeds in the direction of the highest priority, if equal priorities are present the backtracking will proceed in a direction resulting in the fewest number of turns.

8. A process for producing circuit artwork by a data processing machine as set forth in claim 7 wherein the backtracking routine will proceed in a direction resulting in the fewest turns if the current priority is greater than any surrounding priorities.

9. In a process for producing circuit artwork by a data processing machine from coded information of a logic system wherein the data processor generates data representing packages of the logic system elements, assigns locations to the packaged elements, routes the interconnections between terminal pins of the packaged logic system elements and produces instructions for operating a data plotter to generate the circuit artwork, the steps in the routing routine of:

identifying signatures between terminal pins of the logic elements circuit elements and coding the coordinates of the terminal pin locations, computing an interconnection order for each of the identified signatures between terminal pin locations, developing a numbered ordered maze from a starting pin to a destination pin for the next interconnection in the computed order within bounding limits that restrict an interconnection to mutually substantially perpendicular sections, backtracking through the ordered maze to generate a representation of an interconnecting path between a start pin and a destination pin, developing a second numbered ordered maze from a starting pin to a destination pin for the next interconnection available in the computed order within predetermined bounding limits that restrict the interconnection to an area within a rectangle having the starting pin and destination pin at opposite corners thereof, backtracking through the second ordered maze to generate a representation of an interconnecting path between a start pin and a destination pin, developing a third ordered numbered maze from a starting pin to a destination pin for the next interconnection available in the computed order within predetermined bounding limits outlined by a rectangle defined by input data, and backtracking through the third numbered ordered maze to generate a representation of an interconnecting path between a start pin and a destination pin.

10. A process for producing circuit artwork by a data processing machine as set forth in claim 9 repeating the steps of:

developing a numbered ordered maze from a starting pin to a destination pin for each of the interconnections in the computed order within the bounding limits that restrict an interconnection in the computed order within to mutually substantially perpendicular sections prior to developing the second and third numbered ordered maze, and backtracking through the ordered maze for each of the interconnections to generate a representation of a connecting path between a start pin and a destination pin prior to developing the second and third numbered ordered maze.

11. A process for producing circuit artwork by a data processing machine as set forth in claim 10 including repeating the steps of:

developing the second numbered ordered maze from a start pin to a destination pin for each of the interconnections remaining in the computed order prior to developing the third numbered ordered maze, and backtracking through the second numbered ordered maze for each interconnection to generate a representation of a connecting path between a start pin and a destination pin prior to developing the third numbered ordered maze.

12. A process for producing circuit artwork by a data processing machine as set forth in claim 11 including repeating the steps of:

developing the third numbered ordered maze from a start pin to a destination pin for each of the remaining interconnections in the computed order, and backtracking through the third numbered ordered maze for each interconnection to generate a representation of a connecting path between the start pin and a destination pin.

13. A process for producing circuit artwork by a data processing machine as set forth in claim 12 including repeating developing the first, second and third numbered ordered maze for each interconnection remaining in the computed order after the first sequence thereof, and expanding the bounding limits to include additional area of the circuit board configuration.

14. A process for producing circuit artwork by a data processing machine as set forth in claim 13 wherein the backtracking through the ordered maze proceeds along channel priorities read into the data processor as input data.

15. A process for producing circuit artwork by a data processing machine as set forth in claim 14 wherein the backtracking through each ordered maze proceeds along channel priorities with the general restriction that the interconnecting path turns as few times as possible.

16. A process for producing circuit artwork by a data processing machine as set forth in claim 9, including the steps of:

defining the location and parameters of an input/output connector, establishing bounding limits within which a numbered ordered maze will be developed, identifying signatures on the connector pins within the bounding limits with terminal pin signatures, developing a numbered ordered maze from a terminal pin signature to an input/output connector signature within bounding limits that restrict an interconnection to a rectangular area that includes the terminal pin start point and the connector pins as destination points, and backtracking through the ordered maze to generate a representation of an interconnecting path between a terminal pin and one input/output connector pin.

17. A process for producing circuit artwork by a data processing machine as set forth in claim 16, including repeating the steps of:

developing a numbered ordered maze for each terminal pin signature identified with input/output connector pins within the established bounding limits, and backtracking through the ordered maze for each signature to generate a representation of a connecting path to a connector pin.

18. In a process for producing circuit artwork by a data processing machine from coded information of a logic system wherein the data processor generates data representing packages of the logic system elements, assigns locations to the packaged elements, routes the interconnections between terminal pins of the packaged logic system elements and produces instructions for operating a data plotter to generate the circuit artwork, the steps in the routing routine of:

identifying signatures between terminal pins of the logic system elements and coding the coordinates of the terminal pin locations, establishing bounding limits within which a numbered ordered maze will be developed, developing a numbered ordered maze for the next interconnection available from a starting pin to a destination pin within the predetermined bounding limits, and backtracking through the ordered maze along channel priorities to generate a representation of an interconnecting path between a start pin and a destination pin.

19. A process for producing circuit artwork by a data processing machine as set forth in claim 18 wherein the circuit board configuration is divided into cells along vertical and horizontal channels and each cell is coded with a priority number one through nine to establish the channel priorities.

20. A process for producing circuit artwork by a data processing machine as set forth in claim 19 wherein the channel priority for each cell on the circuit board configuration is determined by the sum of the channel priorities of the intersecting vertical and horizontal channels.

21. A process for producing circuit artwork by a data processing machine as set forth in claim 20 wherein the backtracking proceeds to the highest numbered channel priority greater than the priority of the cell presently considered.

22. A process for producing circuit artwork by a data processing machine as set forth in claim 21 wherein the backtracking proceeds along a straight line when the channel priorities of the surrounding cell are less than the cell presently under consideration.

* * * * *